F. PETELER.
HAND-BINDERS FOR HARVESTERS.

No. 193,994. Patented Aug. 7, 1877.

Witnesses.
Otto Hufeland
Robt. E. Miller.

Inventor.
Francis Peteler
by
Van Santvoord & Hauff
his attorneys

UNITED STATES PATENT OFFICE.

FRANCIS PETELER, OF MINNEAPOLIS, MINNESOTA.

IMPROVEMENT IN HAND-BINDERS FOR HARVESTERS.

Specification forming part of Letters Patent No. 193,994, dated August 7, 1877; application filed December 26, 1876.

*To all whom it may concern:*

Be it known that I, FRANCIS PETELER, of Minneapolis, in the county of Hennepin and State of Minnesota, have invented a new and Improved Binding Attachment to Harvesters and Mowers, which invention is fully set forth in the following specification, reference being had to the accompanying drawings, in which—

Figure 1:
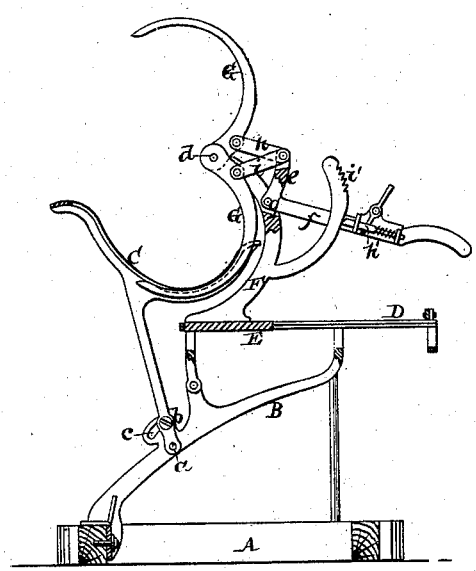
Figure 2:
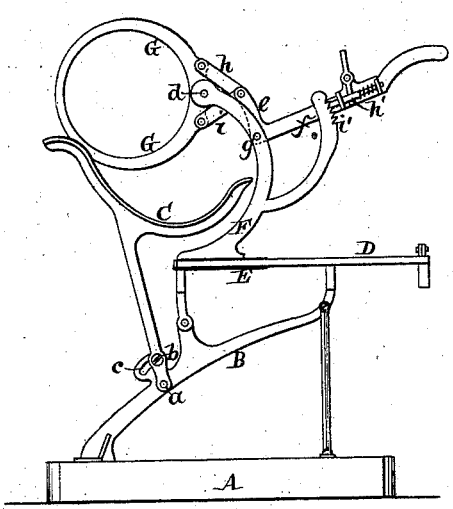

Figure 1 represents a longitudinal vertical section when the tongs are open for receiving a bundle. Fig. 2 is a side view of the same when the bundle is compressed between the tongs ready to receive the band.

Similar letters indicate corresponding parts.

This invention relates to certain improvements in hand-binders for harvesters; and it consists in the combination, with a receiving-trough for the material to be bound, and a frame constructed to slide in suitable ways, of tongs composed of two curved jaws pivoted together, a bell-crank lever, and two rods attached to said lever and to the jaws, by which means the latter are operated to grasp the material in the trough, as will more fully hereinafter appear.

In the drawings, the letter A designates a portion of the frame of a harvester or mowing-machine, to which my binding attachment is applied. From this frame extends a standard, B, which is secured in position by set-screws, so that it can be conveniently adjusted in the required relation toward the cutting mechanism. This standard forms the support for a trough, C, which is made of sheet metal, or any other suitable material, and the foot of which is secured to said standard by a pivot, $a$, and by a set-screw, $b$, that passes through a segmental slot, $c$, formed in the standard, so that when the set-screw is released the trough can be swung back and forth and adjusted in the desired relation toward the mechanism of the harvester or mower, which serves to deliver the cut material on the trough.

To the standard B are firmly secured horizontal guideways D, between which is fitted a slide, E, and from this slide rises a standard, F, which carries the bundling-tongs G and the mechanism for opening and closing the same.

The jaws of these tongs are semicircular, and when they are opened the lower jaw passes down into a slot formed in the receiving-trough, so that the cut material delivered to said trough drops into the lower jaw.

Both jaws of the tongs swing on one and the same pivot, $d$, which has its bearings in the standard F, and with said jaw is combined a bell-crank lever, $e f$, which has its fulcrum on a pivot, $g$, secured in the standard F. The arm $e$ of this bell-crank lever connects, by rods $h i$, with the two jaws of the tongs G, while the arm $f$ forms a hand-lever, which carries a pawl, $h'$, that engages with a toothed segment, $i'$, extending from and firmly connected to the standard F. When the hand-lever is depressed, the jaws of the bundling-tongs are thrown open, and when the hand-lever is raised, the pawl $h'$ engages with the toothed segment $i'$, and the tongs are retained in their closed position.

Whenever a sufficient quantity of grain or other material has accumulated on the trough C, the hand-lever $f$ is raised, so as to cause the tongs to close tightly upon the cut material, and to bring the same in the form of a bundle of the required size. The standard F is then drawn back in the guideways D, and while the tongs are retained in their closed position by the pawl $h'$ and segment $i'$, the attendant has both his hands free to apply the band. During the time required for this operation a fresh quantity of cut material is delivered to the trough C, and when the first bundle has been tied, the tongs are thrown open, so as to drop this bundle, and, by moving the standard F forward in the guideways D, the lower jaw of the tongs passes beneath the material which in the mean time has accumulated on the trough, and the operation of bundling can be continued without interruption.

The bands which I use by preference for tying my bundles form the subject-matter of a separate application for a patent, and I do not give a detailed description of the same in this present specification.

What I claim as new, and desire to secure by Letters Patent, is—

The combination, with a trough for receiving the material, and a frame constructed to slide in suitable ways, of tongs composed of two curved jaws pivoted together, and a bell-crank lever, $f$, and rods $h$ and $i$ attached to said lever and to the jaws, substantially as and for the purpose described.

In testimony that I claim the foregoing I have hereunto set my hand and seal this 12th day of December, 1876.

FRANCIS PETELER. [L. S.]

Witnesses:
H. G. O. MORRISON,
H. L. GORDON.